United States Patent
Enke et al.

(10) Patent No.: US 12,196,118 B2
(45) Date of Patent: Jan. 14, 2025

(54) MOTOR VEHICLE HAVING A REAR APRON

(71) Applicant: Bayerische Motoren Werke Aktiengesellschaft, Munich (DE)

(72) Inventors: Wolfram Enke, Meissen (DE); Jens Jungmann, Pliening (DE); Sven Klussmann, Eichenau (DE); Stefan Kurz, Unterwittelsbach (DE); Thomas Moseler, Landshut (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 18/265,018

(22) PCT Filed: Jan. 13, 2022

(86) PCT No.: PCT/EP2022/050636
§ 371 (c)(1),
(2) Date: Jun. 2, 2023

(87) PCT Pub. No.: WO2022/167188
PCT Pub. Date: Aug. 11, 2022

(65) Prior Publication Data
US 2024/0026807 A1    Jan. 25, 2024

(30) Foreign Application Priority Data
Feb. 3, 2021    (DE) .................. 10 2021 102 413.7

(51) Int. Cl.
*F01N 3/05*    (2006.01)
*B60K 11/08*    (2006.01)
*B60K 13/04*    (2006.01)

(52) U.S. Cl.
CPC .............. *F01N 3/055* (2013.01); *B60K 11/08* (2013.01); *B60K 13/04* (2013.01); *F01N 2260/022* (2013.01); *F01N 2340/04* (2013.01)

(58) Field of Classification Search
CPC .......... F01N 3/055; F01N 13/08; F01N 13/00; F01N 2260/022; F01N 2340/04;
(Continued)

(56) References Cited

U.S. PATENT DOCUMENTS

| 3,563,030 A | * | 2/1971 | Lentz et al. | ............ F01N 3/227 60/299 |
| 6,435,298 B1 | | 8/2002 | Mizuno et al. | |

(Continued)

FOREIGN PATENT DOCUMENTS

| DE | 297 21 562 U1 | 4/1998 |
| DE | 199 61 316 A1 | 6/2001 |

(Continued)

OTHER PUBLICATIONS

Machine Translation DE 10 2016 106 820 (Year: 2023).*
International Search Report (PCT/ISA/210) issued in PCT Application No. PCT/EP2022/050636 dated Apr. 26, 2022 with English translation (4 pages).

(Continued)

*Primary Examiner* — Dapinder Singh
(74) *Attorney, Agent, or Firm* — Crowell & Moring LLP

(57) ABSTRACT

An exhaust system has at least one exhaust tailpipe which is led through a rear apron of the motor vehicle. The drive train of the vehicle has a rear axle. An air duct is provided in a rear region, which air duct supplies exterior air to the at least one exhaust tailpipe at least in sections. The rear axle has at least one rear axle cover at least in sections. An air inlet opening of the air duct is arranged behind the rear axle cover in a travel direction of the motor vehicle. As a result of the design of the motor vehicle, the rear apron is protected from impingement by hot exhaust gases.

9 Claims, 2 Drawing Sheets

X-Z section

(58) Field of Classification Search
CPC ............. F01N 2270/00; F01N 2270/02; F01N 2270/04; F01N 2270/06; F01N 2270/08; F01N 2270/10; B60K 11/08; B60K 13/04; Y02T 10/12; Y02T 10/40
See application file for complete search history.

(56) References Cited

U.S. PATENT DOCUMENTS

| | | | |
|---|---|---|---|
| 8,359,836 B2 * | 1/2013 | Takahashi | F01N 1/003 60/314 |
| 10,669,917 B1 * | 6/2020 | Atwell | F01N 13/082 |
| 2008/0057848 A1 * | 3/2008 | Gray | F01D 17/145 454/69 |
| 2014/0251241 A1 | 9/2014 | Tajima | |
| 2015/0021111 A1 | 1/2015 | Hillstroem et al. | |
| 2017/0356325 A1 * | 12/2017 | Zhang | F02D 41/0077 |

FOREIGN PATENT DOCUMENTS

| | | |
|---|---|---|
| DE | 10 2014 217 802 A1 | 3/2016 |
| DE | 10 2015 108 509 A1 | 12/2016 |
| DE | 10 2016 106 820 A1 | 8/2017 |
| DE | 10 2020 103 196 | 8/2021 |
| EP | 1 013 540 A2 | 6/2000 |
| EP | 2 834 138 B1 | 10/2018 |
| JP | 7-215074 A | 8/1995 |

OTHER PUBLICATIONS

German-language Written Opinion (PCT/ISA/237) issued in PCT Application No. PCT/EP2022/050636 dated Apr. 26, 2022 (5 pages).
German-language Search Report issued in German Application No. 10 2021 102 413.7 dated Sep. 21, 2021 with partial English translation (11 pages).

* cited by examiner

Prior Art     X-Y section

X-Z section

X-Y section

MOTOR VEHICLE HAVING A REAR APRON

BACKGROUND AND SUMMARY OF THE INVENTION

The invention relates to a motor vehicle having a drive train and an exhaust gas system with at least one exhaust gas end pipe, which is guided through a rear apron of the motor vehicle.

In the rear region of a motor vehicle which is provided with an internal combustion engine, components of the exhaust gas system are located, such as, for example, the rear silencer and the exhaust gas end pipes. These components become very hot during operation and therefore require adequate cooling which is generally carried out by travel wind. However, a diffusor as an underbody covering in the rear region of the vehicle screens the rear silencer with respect to the travel wind which flows along under the vehicle. An influx of cooling air to the rear silencer or the exhaust gas end pipes may, for example, be carried out by means of an extensive recess in the diffusor in the region of the rear silencer. As a result of such a recess for cooling the rear silencer or the exhaust gas end pipes, however, potential for the buoyancy targets and drag coefficient are lost. The effectiveness of such cooling measures is in most cases low so that the temperatures which are produced in the region of the exhaust gas system taking into account all optimization measures are often slightly below the acceptable limit values.

During travel, as a result of the flow around the vehicle, a low pressure level is produced, in particular around the exhaust gas end pipes and in the region of the rear axle components so that, under unfavorable circumstances, there may be produced a return flow of hot exhaust gas discharged from the exhaust gas end pipes into this region of low pressure, that is to say, for example, in the region of the rear apron and the underbody covering, which particularly occurs with an exhaust gas system having visible exhaust gas end pipes. The occurrence of such exhaust gas return flows ensures an additional undesirable thermal input in the rear region, or the rear apron of the motor vehicle.

From the German Utility Model DE 297 21 562 U1, an air redirection apparatus in the rear region of a motor vehicle for influencing the rear turbulence is known. This air redirection apparatus which is in the form of a channel guides a portion of the air in the trailing region behind the vehicle rear, whilst another portion of the air is intended to flow toward the rear over a rear portion which is in the form of a diffusor. The advantage with respect to the drag coefficient results from the reduction of the rear base face since the rear opening of the channel allows a portion of the rear base face to be omitted.

From the German Patent document DE 199 61 316 A1, an air redirection apparatus in the rear region of a motor vehicle is known, which introduces air flowing below the vehicle underbody into the air collection housing. This air collection housing opens in an end pipe diaphragm through which the exhaust gas end pipes lead. The air flow directed through the air flow collection housing into the end pipe diaphragm pushes the exhaust gases away toward the rear and is intended to prevent an exhaust gas return flow.

In the European Patent EP 2 834 138 B1, a diffusor having an air inlet for the rear silencer is described. The diffusor is intended to completely cover the rear silencer and have an air inlet for cooling air behind the rear silencer. For large structural heights of the rear silencer, an extensive recess is provided in the diffusor face. As a result of this large opening, however, the diffusor loses potential with respect to the drag coefficient and the buoyancy targets. The cooling air is intended to be introduced in a state driven mainly as a result of a pressure difference into the space covered by the diffusor around the rear silencer. After receiving waste heat at the rear silencer, the heated cooling air should flow away forward below the diffusor casing.

In DE 10 2015 108 509 A1, there is provided in the rear region of a motor vehicle an air guide which is intended to bring about a cooling of the rear silencer via an air inlet opening in the vehicle underbody. The air which is introduced at that location flows around the rear silencer for cooling purposes and is discharged upward or directly at the vehicle rear into a surrounding region in which reduced pressure is applied.

U.S. Pat. No. 6,435,298 B1 sets out and describes an underbody structure of a motor vehicle, which is spaced apart from the lower side of a rear silencer which is arranged in the longitudinal direction so that travel wind can flow along toward the rear through the intermediate space which is produced in this manner below the rear silencer. This air flow is discharged at the vehicle rear. This serves to cool the lower side of the rear silencer.

From the German Patent Application which has not yet been published, with the official file reference DE 10 2020 103 196.3, on which the present invention is based, there is known a motor vehicle having an underbody covering which is provided in the rear region and which is arranged below a rear silencer of an exhaust gas system. The rear silencer is provided with at least one exhaust gas outlet and has at least one exhaust gas end pipe which leads from the rear silencer to the vehicle rear. The underbody covering is provided with at least one air inlet through which air which flows below the motor vehicle is directed into a region above the underfloor covering, wherein the at least one exhaust gas outlet is provided with at least one exhaust gas end pipe diaphragm which at least partially surrounds the at least one exhaust gas end pipe and which forms an air flow channel between the exhaust gas end pipe and the exhaust gas end pipe diaphragm which is open toward the region above the underfloor covering and toward the vehicle rear. The air flow channel forms in this instance the air outlet from the region above the underfloor covering.

An object of the present invention is to configure a generic motor vehicle in such a manner that, in the region of an exhaust gas end pipe, a sufficient cooling of the rear apron of the motor vehicle is ensured.

This object is achieved in accordance with the independent claims, wherein the rear axle at least partially has a rear axle cover, and an air inlet opening of the air guiding channel is arranged in a travel direction of the motor vehicle behind the rear axle cover.

The air guiding channel according to the invention taps through the air inlet opening thereof cool, energy-rich (kinetic energy) underfloor flow (downstream of a Rear Axle Cover, RAC) of the motor vehicle and guides it to the at least one exhaust gas end pipe. The supplied cooling air flows into the region between the rear apron and the at least one exhaust gas end pipe into the vehicle rear. On the one hand, a return flow of the exhaust gas into the rear apron is thereby prevented and, on the other hand, the return flow is displaced along the rear apron surface (externally) away from the rear apron. As a result of these two effects, the rear apron temperature can be significantly lowered so that overheating of the rear apron is safely prevented. The air guiding channel does not in this instance have to be an individual component, but can instead be formed by body elements and other structural elements.

Developments of the invention are described in the dependent claims.

As a result of the configuration of the motor vehicle, a geodetically lower portion of the air guiding channel is arranged with respect to a standing surface of the motor vehicle at the height of the rear axle cover or lower, the cold, energy-rich underfloor flow is directed into the air guiding channel.

In one aspect, the air inlet opening of the air guiding channel is spaced apart from the rear axle cover by between 1 mm and 500 mm, is a particularly preferred range in which the cooling according to the invention of the rear apron functions very well.

In one aspect, the air inlet opening of the air guiding channel has a flow cross section between 100 mm² and 1,000,000 mm², is also a particularly preferred range in which the cooling according to the invention of the rear apron functions very well.

In one aspect, a thermal insulation is arranged in the region of the at least one exhaust gas end pipe between the exhaust gas end pipe and an inner rear region, advantageously additionally prevents an overheating of the inner rear region of the motor vehicle. Furthermore, the thermal insulation also acts as a flow guiding element in order to direct the air selectively in the direction of the vehicle rear. The thermal insulation may, for example, be constituted by a metal or plastics material sheet or a temperature-resistant foam.

In one aspect, the rear axle cover extends over at least one chassis component, is a particularly preferred variant. A chassis component is intended to be understood, for example, to be a shock absorber. This results in the air inlet opening of the air guiding channel being arranged rather eccentrically, that is to say, in a direction toward a side wall of the motor vehicle.

In a particularly preferred manner, the rear axle cover is in the form, at the outer side, that is to say, toward the bottom, of a flow guiding element, whereby the effect according to the invention is further amplified that the flowing air in the region of the air inlet opening of the air guiding channel is accelerated and the throughflow thereof with cooling air is improved.

The fact that the rear axle cover is preferably formed spherically or cylindrically or in a downward direction are preferred embodiments of a flow guiding element.

The fact that at the air guiding channel has a flow cross section which is round or oval or angular or which can change in cross section shows that the air guiding channel can assume almost any geometric shape. As already mentioned, this does not have to be a separate component, but may be formed by means of body elements and/or other components.

The invention is explained briefly below with reference to three figures.

BRIEF DESCRIPTION OF THE DRAWINGS

Below, for FIGS. 1 to 3, the same reference numerals apply to the same structural elements and the same gaseous materials.

DETAILED DESCRIPTION OF THE DRAWINGS

Figure 1:
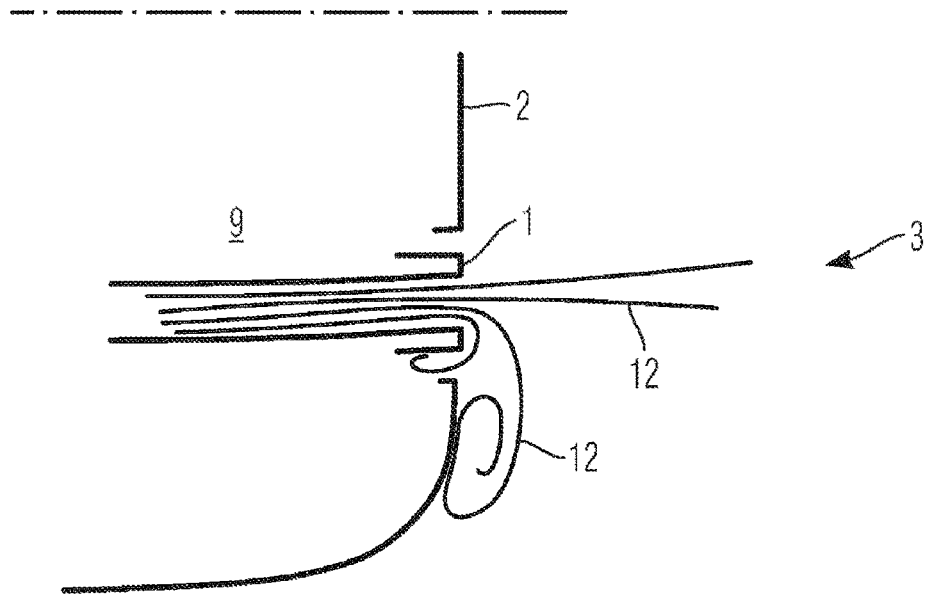
FIG. 1 is a schematic X-Y section through a rear region of a motor vehicle according to the prior art.

FIG. 1 shows a schematic X-Y section (transversely relative to a longitudinal and vertical vehicle axis) through a rear region 3 of a motor vehicle having a drive train (which is not illustrated) and having an exhaust gas system (which is not illustrated in greater detail) with an exhaust gas end pipe 1 according to the prior art. The exhaust gas end pipe 1 is guided through an opening which has no reference numeral in the rear apron 2 of the motor vehicle. A hot exhaust gas which is discharged from the exhaust gas end pipe 1 is designated 12.

As can be seen in FIG. 1, the hot exhaust gas 12 forms in the rear region 3 of the motor vehicle an eddy which guides the hot exhaust gas 12 along the rear apron 2. Some rear apron forms, as in the present embodiment, bring about, in combination with the geometric embodiment of the exhaust gas end pipe 1, a return flow of the hot exhaust gas in and along the rear apron 2. The hot exhaust gas 12 consequently in an unfavorable manner brings about a local increase of the rear apron temperature, which (without the counter-measure according to the invention) in an extreme case can lead to melting of the surface of the rear apron 2.

Figure 2:
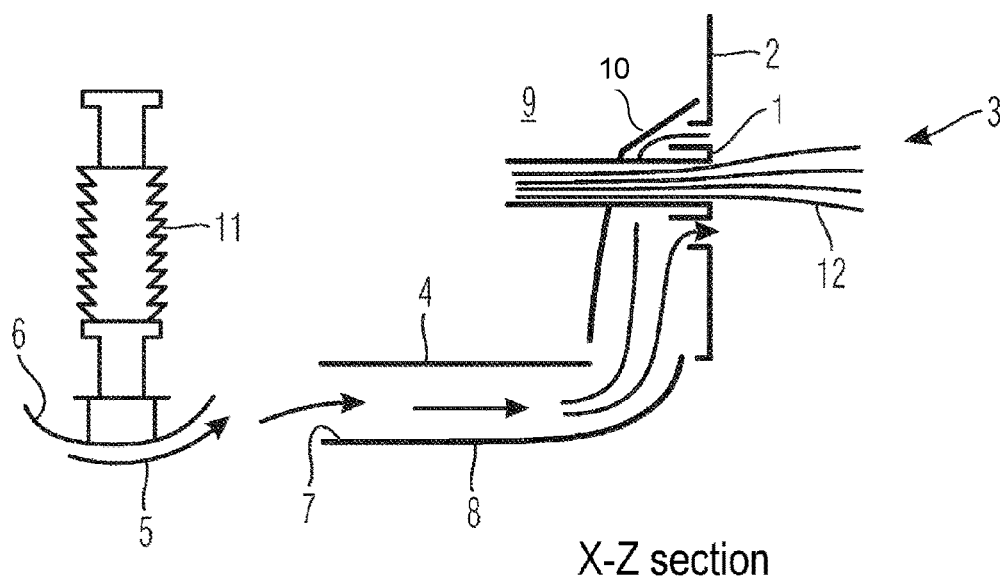
FIG. 2 is a schematic X-Z section through a rear region of a motor vehicle according to an embodiment of the invention.

FIG. 2 shows a schematic X-Z section (section through a longitudinal and vertical vehicle axis) through a rear region 3 of a motor vehicle according to the invention. An exhaust gas end pipe 1, from which hot exhaust gas 12 flows out, is illustrated again. The exhaust gas end pipe 1 is guided through an opening which has no reference numeral in the rear apron 2 of the motor vehicle.

According to the invention, a rear axle (which is not illustrated) has at least partially a rear axle cover (RAC) 6, wherein an air inlet opening 7 of an air guiding channel 4 is arranged in a travel direction of the motor vehicle behind the rear axle cover 6. Above the rear axle cover 6, a chassis component 11, in this instance, for example, a shock absorber, is illustrated.

The air guiding channel 4 has a geodetically upper portion and a geodetically lower portion 8. The geodetically lower portion 8 of the air guiding channel 4 is arranged with respect to a standing surface of the motor vehicle at the height of the rear axle cover 6 or lower. As a result of this arrangement, an acceleration of the flowing air counter to a travel direction of the motor vehicle behind the rear axle cover 6 is achieved, whereby the cool air flows or slides or is accelerated into the air guiding channel 4. A flowing air 5 is illustrated schematically by means of arrows, wherein only a single arrow is given a reference numeral. This air 5 is conveyed further in the air guiding channel 4 and flows around the exhaust gas end pipe 1 at least partially and is subsequently at least partially discharged out of the rear apron 2 of the motor vehicle, wherein the air 5 is substantially discharged into the environment partially coaxially with respect to the exhaust gas end pipe 1.

Preferably, the air inlet opening 7 of the air guiding channel 4 is spaced between 1 mm and 500 mm apart from the rear axle cover 6. In this value range or spacing range, the effect according to the invention, the flowing through of the air guiding channel 4, is particularly well developed.

Furthermore, the air inlet opening 7 of the air guiding channel 4 has a flow cross section between 100 mm² and 1,000,000 mm². This is also a particularly preferred value range in which the effect according to the invention is particularly well developed. The air guiding channel 4 does not in this instance have to be constituted by a separate component, but can instead be formed by means of body structural elements and/or other structural elements.

In a development of the invention, in the region of the at least one exhaust gas end pipe 1 between the exhaust gas end pipe 1 and an inner rear region 9 a thermal insulation 10 is arranged. This prevents, on the one hand, overheating of the inner rear region 9 of the motor vehicle and further acts as a flow guiding element for selectively guiding the air in the air guiding channel 4. The thermal insulation 10 may, for example, be constituted by a metal or plastics material sheet or a temperature-resistant foam.

Preferably, the rear axle cover 6 extends over at least one chassis component 11, such as, for example, a shock absorber. This leads to the air inlet opening 7 of the air guiding channel 4 being arranged rather eccentrically in the direction of a side wall of the vehicle.

In a particularly preferred manner, the rear axle cover 6 is formed at the outer side, that is to say, in the direction of the ground surface, as a flow guiding element. The air in the region of the air inlet opening 7 is thereby accelerated so that a particularly large amount of cool air flows through the air guiding channel 4.

In a particularly preferred manner, the rear axle cover 6 is constructed in a spherical or cylindrical manner in a downward direction. These embodiments ideally form a flow guiding element.

Furthermore, the air guiding channel 4 has a flow cross section which is round and/or oval and/or angular and/or can change in cross section. That is to say, the air guiding channel 4 can take on almost any cross section and any cross sectional form and consequently can be adapted in an ideal manner to the body form of the motor vehicle. The air guiding channel 4 is in this instance formed mainly by body elements and other structural elements.

Figure 3:
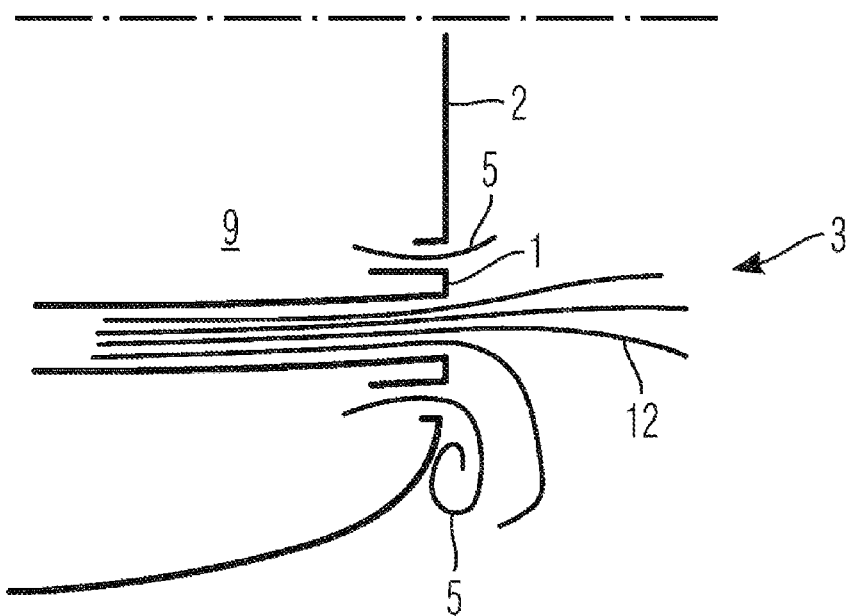
FIG. 3 is a schematic X-Y section through the rear region of the motor vehicle according to an embodiment of the invention.

FIG. 3 shows similarly to FIG. 1 an X-Y section through the rear region 3 of the motor vehicle according to the invention. The exhaust gas end pipe 1 and the rear apron 2 through which the exhaust gas end pipe extends are illustrated again. An inner rear region is designated 9 again. A discharged hot exhaust gas is designated 12 again. According to the invention, the fresh, cool air 5 is discharged substantially partially coaxially with respect to the exhaust gas end pipe 1 out of the rear apron 2. As can be seen in FIG. 3, in place of the hot exhaust gas 12, the fresh, cool air forms, for example, an eddy or a partial fresh air jacket in the rear region 3 and thus keeps the hot exhaust gas 12 away from the surface of the rear apron 2 which according to the invention can no longer overheat.

The air inlet opening 7 of the air guiding channel 4 according to the invention thus taps cool, energy-rich underbody flow on the underbody of the motor vehicle downstream of the rear axle cover 6 and guides it to the at least one exhaust gas end pipe 1. The cooling air 5 supplied flows in the region between the rear apron 2 and the exhaust gas end pipe 1 at least partially out of the vehicle rear 3. On the one hand, a return flow of the exhaust gas 12 into the rear apron 2 is thereby prevented and, on the other hand, the return flow is displaced along the rear apron 2 (externally) and consequently away from the rear apron 2. As a result of these two effects, the rear apron temperature can be significantly reduced so that a melting of the rear apron 2 is prevented according to the invention.

LIST OF REFERENCE NUMERALS

1. Exhaust gas end pipe
2. Rear apron
3. Rear region
4. Air guiding channel
5. Air
6. Rear axle cover (RAC)
7. Air inlet opening
8. Lower portion
9. Inner rear region
10. Thermal insulation
11. Chassis component
12. Exhaust gas

The invention claimed is:

1. A motor vehicle having a drive train and an exhaust gas system with at least one exhaust gas end pipe, comprising:
    a rear apron through which the at least one gas end pipe is guided;
    an air guiding channel in a rear region of the motor vehicle, the air guiding channel supplying exterior air to the at least one exhaust gas end pipe at least partially;
    a rear axle cover of a rear axle of the drive train,
    wherein an air inlet opening of the air guiding channel is arranged in a travel direction of the motor vehicle behind the rear axle cover.

2. The motor vehicle according to claim 1, wherein a geodetically lower portion of the air guiding channel is arranged with respect to a standing surface of the motor vehicle at a height of the rear axle cover or lower.

3. The motor vehicle according to claim 1, wherein the air inlet opening of the air guiding channel is spaced apart from the rear axle cover by between 1 mm and 500 mm.

4. The motor vehicle according to claim 1, wherein the air inlet opening of the air guiding channel has a flow cross section between 100 mm² and 1,000,000 mm².

5. The motor vehicle according to claim 1, further comprising:
    a thermal insulation arranged in a region of the at least one exhaust gas end pipe between the exhaust gas end pipe and an inner rear region of the motor vehicle.

6. The motor vehicle according to claim 1, wherein the rear axle cover extends over at least one chassis component.

7. The motor vehicle according to claim 1, wherein the rear axle cover has, at an outer side thereof, a form of a flow guiding element.

8. The motor vehicle according to claim 7, wherein the rear axle cover is formed spherically or cylindrically in a downward direction.

9. The motor vehicle according to claim 1, wherein the air guiding channel has a flow cross section which is round, oval, angular or which changes in cross section.

* * * * *